W. R. CLOSE.
Saw-Jointers.

No. 129,788.                              Patented July 23, 1872.

UNITED STATES PATENT OFFICE.

WALTER R. CLOSE, OF BANGOR, MAINE.

IMPROVEMENT IN SAW-JOINTERS.

Specification forming part of Letters Patent No. 129,788, dated July 23, 1872.

*To all whom it may concern:*

Be it known that I, WALTER R. CLOSE, of Bangor, in the county of Penobscot and State of Maine, have invented a new and useful Jointer for Saws; and I hereby declare the following to be a full, clear, and exact description of my invention, which will enable others to make and use the same, reference being had to the accompanying drawing forming part of this specification, in which—

Figure 2:
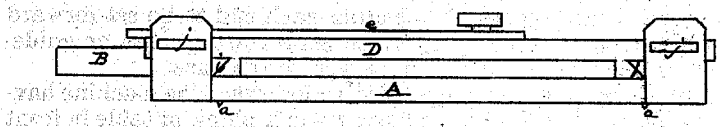
Figure 1:
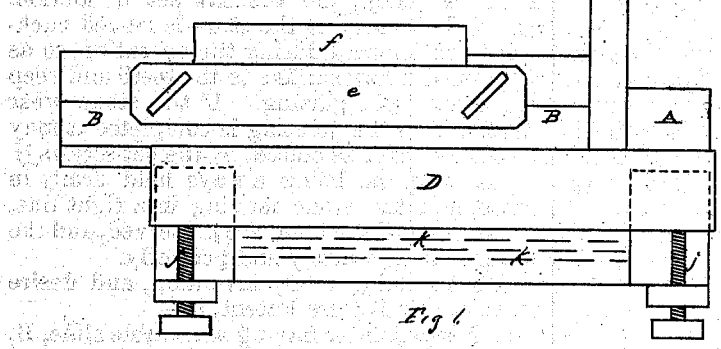
Figure 3:
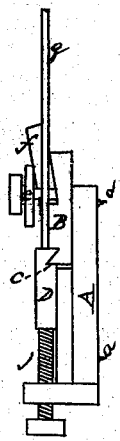

Figure 1 shows a plan of same; Fig. 2, a front elevation; Fig. 3, a side or end view.

Same letters show like parts.

The object of my invention is to provide a machine by which circular saws may be easily and accurately jointed or brought to a true circle. The present method of doing this is by holding a stone by hand against the edge of the rapidly-revolving saw. This requires much time and labor, and from the impossibility of holding the stone perfectly steady the corners of the saw-teeth are apt to be ground off, and the work at best is badly done.

My device will be understood by the reference to the drawing: A shows the base of my machine, provided with pins $a\ a$, or a clamp, by which it is to be secured to a plank or table in front of the saw to be jointed. At B is a slide, capable of moving lengthwise in a groove, $c$, of the top plate D, and provided with a clamp, $e$, for holding a stone, $f$; it also has a square, $g$, for the purpose of setting the jointer square with the edge of the saw. The top plate D is also movable, sliding forward or back in grooves or bevels $h\ i$ in the base A. Its motion is regulated by means of set-screws $j\ j$ at each end, and allows it to be advanced, carrying with it the slide B, as the stone is worn away by the action and friction of the saw-teeth. To enable each end to be set forward equally by these set-screws, guides or guide-lines $k\ k$ are affixed to the base.

It is operated as follows: The machine having been placed upon a plank or table in front of the saw, it is set at right angles to its edge by means of the square $g$, and at such a distance from it that the stone will just touch the teeth. It is then secured in place by the pins $a\ a$ or a clamp, and the saw set in motion. The slide B carrying the stone is moved backward and forward during the operation, so as to present a new surface to the teeth and keep the stone from glazing. If the stone wear down before the jointing is completed it may be set forward, as stated, by the set-screws $j\ j$.

The machine being always held firmly in place, and the stone moving in a right line, the corners of the teeth are preserved, and the work done accurately and perfectly.

What I claim as my invention, and desire to secure by Letters Patent, is—

1. A saw-jointer having a movable slide, B, clamp $e$, and stone $f$, substantially as herein specified.

2. In combination with the above, the square $g$, as set forth.

3. The combination of the slide B with the adjustable top plate D and set-screws $j\ j$, as specified, and guides $k$, as set forth.

W. R. CLOSE.

Witnesses:
WM. FRANKLIN SEAVEY,
J. Y. RICKER.